Patented Oct. 29, 1946

2,410,157

UNITED STATES PATENT OFFICE 2,410,157

LIQUID EXTRACT OF COFFEE AND THE PROCESS OF EXTRACTING AND PREPARING THE SAME

Walter S. Fredrickson, Fort Wayne, Ind.

No Drawing. Application October 13, 1943, Serial No. 506,068

18 Claims. (Cl. 99—71)

This invention relates to the preparation of a vegetable extract and more particularly to an improved liquid extract of coffee and the process of extracting and preparing the same.

Heretofore, numerous attempts have been made to produce, by one method or another, a liquid extract of coffee containing all the natural coffee flavors, ingredients and aromas so as to be appealing and pleasant to the taste and smell, and at the same time capable of being stored without spoiling for use over a relatively long period of time. These attempts, however, for one reason or another, have in general been relatively unsuccessful in that the extracts so produced failed in one or more respects. In some instances, the liquid coffee extracts failed, because of the deficiencies of the extraction processes practiced, to retain all of the natural flavors and aromas in that certain of the necessary and desirable ingredients and volatile substances were lost, dissipated or completely altered during the process of extraction.

With other extraction processes, the extracts while being perhaps relatively acceptable from the standpoint of natural flavor and aroma, nevertheless were incapable of being kept for any substantial length of time without spoilage. This spoilage was due to the fact that the natural waxes which were extracted from the coffee bean along with the other soluble substances were wholly allowed to remain in the extract or were imperfectly attempted to be removed therefrom. This tendency to spoilage was retarded only to some extent by refrigeration, which was sometimes inconvenient and restricted the range of use of such an extract. In the practice of still other processes, a great deal of waste resulted due to the inability of those processes to extract from the coffee bean all of the valuable soluble material with the consequence that the partly used coffee bean containing useful ingredients was thrown away. This obviously was not only a serious wastage of good coffee but necessarily increased the cost of production of such extracts to such an extent as to make them unprofitable commercially.

It is, therefore, one of the objects of the present invention to provide an improved liquid extract of coffee which contains all the desirable and natural coffee ingredients, flavors and aromas and which at the same time is capable of being stored relatively permanently without spoilage.

Another object of the invention is to provide an improved liquid extract of coffee which is relatively free from deleterious waxes and, therefore, capable of being exposed in use over a relatively long period of time without refrigeration and without spoilage.

A further object of the invention is to provide an improved process of extracting and preparing a liquid extract of coffee by which all the desirable and natural coffee ingredients, flavors and aromas are extracted from the coffee bean to a maximum degree without being lost, dissipated or substantially altered during the extraction process.

Still another object is to provide an improved process of extracting the desirable soluble material from ground coffee beans which comprises expanding and contracting the coffee grounds in a cold water bath so as to break down the internal structures of the grounds and free the relatively imprisoned soluble material therefrom.

Another object is to provide an improved process of extracting the maximum amount of soluble material from the coffee bean.

A still further object is to provide an improved process of removing the waxy substances contained in a liquid extract of coffee.

Other and further objects of the invention will become apparent as this description progresses.

The initial preliminary phase of the improved process preparatory to the grinding and extraction phases comprises the baking of the green coffee beans. In this phase a quantity of the green coffee beans is first placed in a hot oven or other suitable device and allowed to bake slowly therein for approximately forty-five to fifty minutes. This baking step differs considerably from the customary method of roasting coffee for regular table use, which generally involves quickly bringing the green coffee beans to a very high heat, almost scorching, subjecting the beans to that high heat for approximately ten or fifteen minutes and then quickly cooling the roasted beans. However, in the baking step of the present invention, it is preferable that the beans be subjected to a heat at a lower temperature and for a much longer period of time. In this manner the green beans are baked more slowly and the moisture content thereof is reduced to a desired minimum for reasons to be pointed out hereinafter in connection with the subsequent steps of the process. However, it has been found that the degree of heat and the length of the baking period may be varied somewhat so long as the coffee beans are properly baked and their moisture content reduced to a minimum.

After the coffee beans have been baked according to the first phase of the process above described, they are then placed in a cooling zone such as a refrigerator or the like in preparation for grinding. In this cooling zone the temperature of the beans is reduced to a point within the temperature range of 35 to 40° F. so that, upon grinding, the volatile oils will be prevented from dissipating into the atmosphere. It has been found that ordinarily during the grinding operation the grinder generates a considerable amount of heat which tends to raise the temperature of the beans and permit the volatile oils to escape as the bean is cut and heated by the grinder. However, with the initial temperature of the bean reduced prior to grinding, the grinding operation may be completed before enough heat has been generated by the grinder and transmitted to the ground beans to raise their temperature so as to volatilize the essential oils.

Although the degree or size to which the baked and cooled bean is cut may be varied somewhat, it has been determined that the best results from the steps of the process to be described hereinafter can be secured if the grind ranges between a medium and a fine grind. Too coarse a grind has been found unsatisfactory while a very fine grind tends to settle into a sticky mudlike mass on the bottom of the vats or containers used in carrying out the extraction steps of the process.

The next phase of the process comprises the application of a cold water contraction and expansion method by which the volatile oils and the other soluble ingredients are extracted from the coffee grounds. Preparatory to the application of the cold water, the coffee grounds, upon removal from the grinder, are placed in a cooling zone such as a refrigerator or the like, where they are kept until their temperature has been reduced to a point in a temperature range between 10° to 15° F. If the grounds are brought to a lower temperature, the results of the process are found inferior, this being due perhaps in part to the fact that the coffee oils are congealed and prevented from flowing readily during the cold water extraction phase.

When the grounds have been reduced to a temperature between 10° to 15° F., they are then placed in suitable containers in a cooling zone and to them is added a quantity of water at a temperature of 33° to 34° F. and preferably at a rate of one and one-third quarts of water to a pound of coffee. This mixture of coffee grounds and cold water may then be agitated for improved results in order to more thoroughly saturate the grounds, after which the mixture may be allowed to stand quiescently for a sufficient period of time to permit the grounds to soak up as much water as possible and to permit a considerable amount of the soluble and other elements of the coffee grounds to go into solution or pass into the water. Approximately one hour has been found sufficient for this period of quiescent soaking. During this entire period the mixture of cold water and grounds is maintained at a non-freezing temperature of from 33° to 34° F.

At the end of this period the cold water and coffee mixture, which by this time contains coffee ingredients in solution and otherwise, is then heated so as to raise its overall temperature to approximately 40° to 42° F. As the temperature of the water is raised from 33°-34° to 40°-42° F., the water of the mixture, including the water that has been absorbed by and is contained within the internal structure of the coffee grounds, contracts to a condition of its greatest density in accordance with the recognized physical laws of the expansion and contraction of water. When the temperature of the mixture reaches 40°-42° F., it is then reduced to its original temperature of 33° to 34° F., and as the temperature is reduced the water, including that water contained within the internal structures of individual grounds, is expanded, thereby expanding the individual grounds. Then, after reaching 33° to 34° F., the mixture is again raised to a temperature of 40° to 42° F., after which it is again reduced to 33° to 34° F.

During this period of soaking in the cold water as above described, during which the raising and lowering of the temperature of the mixture is repeated, a great percentage of the volatile oils and other soluble ingredients are extracted from the coffee grounds. By starting the mixture at a temperature of 33° to 34° F., followed by raising it to 40° to 42° F. and then reducing it back to 33° to 34° F. and then repeating the raising and lowering of the temperatures, the water within the individual coffee grounds is first contracted, then expanded, then again contracted and then again expanded. By this repeated contraction and expansion of the mixture the individual grounds are progressively expanded and thoroughly worked or pumped, and their internal fibrous structures are in effect torn apart so that the portion of the soluble and other ingredients which might otherwise be imprisoned therein are made accessible to the water and in a position to pass into solution and into the water. The individual grounds at the end of this cold water treatment are in a considerably expanded condition.

In practicing the foregoing cold water extraction phase of the process, it is important that the mixture remain relatively quiescent after its initial agitation when the 33° to 34° F. water is initially poured on the cold grounds. It has been found that an inferior extract results if the cold mixture is agitated continually during the periods when its temperature is being raised and lowered as above described. The best results have been secured by permitting the mixture to remain substantially quiescent during the entire cold water period during the raising and lowering of the temperature in order to take full advantage of the natural expansion and contraction of the action of the water.

After the mixture has been finally reduced to the 33° to 34° F. temperature as above described, the liquid is then poured off the considerably expanded grounds and the grounds are then put into a press in order to press still more liquid out of the grounds. Satisfactory results have been secured where the grounds are subjected to a pressure of ten tons. The liquid that was poured off prior to the pressing operation and the liquid that was pressed out of the grounds thereafter is then commingled and passed into a cooling zone where it is maintained at a temperature of from 35° to 40° F. until the extracts later produced by the hot water phase of the process are ready for mixing therewith as will be more fully described hereinafter. This cold water extract for the purposes of this description will be referred to as extract No. 1.

Although at the outset, as stated above, one and one-third quarts of water was added to each pound of ground coffee, nevertheless the amount of the extract recovered even after the ten ton press has been used on the expanded coffee grounds, amounts to only three-quarters of a quart to each pound of coffee. The amount of water extracted from the grounds, however, may vary somewhat with the different types of coffees used. The efficiency of this cold water expansion and contraction method of extraction is considerably increased by providing coffee grounds which have a relatively low moisture content so that the grounds are in a position to absorb a great deal of water and expand greatly during the cold water phase of the process. After the grounds have been first pressed and the extract No. 1 segregated, the coffee grounds are still in a greatly expanded condition so that during the future phases of the process to be described hereinafter, involving the application of hot water, the soluble ingredients of the grounds are in a position to more readily pass into solution. The cold water expansion and contraction method so expands and affects the internal structure of the individual grounds that operation of the hot water phase of the process is facilitated and made more efficient.

The first step in the hot water phase of the improved process comprises adding to the grounds from which a greater percentage of the cold water has been poured off or pressed out, another quantity of water at a temperature of 33° to 34° F. which is the approximate temperature of the remaining grounds after extract No. 1 has been segregated therefrom. This second quantity of water is added at a rate of approximately one quart for every pound of dry grounds initially used. This mixture is then heated to a temperature of approximately 125° F., after which the liquid is drawn off and the grounds again pressed in the same manner as stated above. This resulting extract, which for the purposes of this description will be referred to as extract No. 2, is then quickly cooled to a temperature of from 35° to 40° F. at which temperature it is maintained until all the extracts are ready for mixing. It has been found that for every quart of water added during this first phase of the hot water process the extract therefrom is approximately of the same quantity.

Upon segregation of extract No. 2, a further or third quantity of water is added to the coffee grounds at the rate of one quart per pound of dry grounds and at a temperature of 210° F. This mixture is then heated to approximately 195° F. Although the water is at a temperature of 210° F. when poured on the grounds, the fact that the grounds are at a temperature of less than 125° F. causes the resultant temperature of the mixture to be considerably below 195° F. When this mixture has reached a temperature of approximately 195° F. the liquid is again poured off and the grounds again pressed. This resulting extract which for the purposes of this description will be referred to as extract No. 3, is also quickly cooled to a temperature of from 35° to 40° F. at which temperature it likewise is held until the next extract is ready for mixing. The amount of extract No. 3 is substantially the equivalent of the amount of hot water that was added at the 210° F. temperature.

Again to the same grounds is added an amount of water in substantially the same quantity as the previous step but at a temperature of 200° F. and this mixture is then placed in a pressure cooker wherein its temperature is raised to a point within a range of 275° to 300° F. without boiling. After this high temperature has been reached the mixture is then permitted to cool somewhat, following which the liquid is poured off. The grounds are then again pressed and the pressed liquid is added to the amount poured off, resulting in an extract of substantially the same quantity as that added at 200° F. temperature and which extract will be referred to hereinafter as extract No. 4. This extract likewise is quickly cooled to a temperature of between 35° to 40° F.

When extract No. 4 has been so reduced in temperature, all the extracts Nos. 1, 2, 3 and 4 are thereafter mixed together into one combined extract of a temperature ranging between 35° to 40° F. At this stage of the improved process, the resultant extract combined from the extracts Nos. 1, 2, 3 and 4 may be used to make a cup of coffee that is pleasant to the taste and possesses a satisfying coffee aroma. However, such resultant extract must be used in the amount of approximately three-fourths of an ounce to a cup of hot water and hence is not in sufficiently concentrated form to be commercially practical. Also, the resultant extract contains certain waxy substances which, if not removed, cause the extract to spoil readily unless placed in a refrigerator.

It is, therefore, a final part of the improved process to prepare a concentrate of the resultant extract and to remove the waxy substances from the extract to prevent spoilage, these two results being accomplished for the most part at substantially the same time during the same operation. The presence of these waxy substances in the coffee extract has little effect on the taste or aroma of the coffee since they are relatively tasteless. Yet they are the deleterious elements of the extract causing souring and being relatively indigestible.

The first operation in the removal of the waxy substances was commenced when, as stated hereinbefore, each of the hot extracts, Nos. 2, 3 and 4, were quickly cooled. It has been found that if those extracts were not quickly cooled but were cooled slowly or permitted to stand at room temperature for a relatively short period of time without artificial cooling means, the waxy substances in each of the extracts would become set therein and impossible to remove without destroying the flavor and aroma of the extracts.

Upon being mixed, the resultant combined extract is first placed in a cooling zone, such as a refrigerator or the like, at a temperature from 33° to 34° F. where it is permitted to remain undisturbed for a quiescent period, preferably from between four to five days. During this quiescent period at that low temperature a separation of the waxy substances occurs, the heavier waxy substances settling to the bottom of the container, the light waxy substances rising in uncollectible form to the top of the extract and the medium weight waxy substances which are almost the same density as the coffee extract floating just above the heavy waxy substances. At the end of this quiescent period, the heavier waxy substances become substantially set or caked on the bottom of the container and the extract is then drawn off leaving the heavy waxy substances and some of the medium weight waxy substances in the container. However, much of the medium and light waxy substances are unavoidably drawn off along with the extract and are contained in sufficient quantities to spoil the extract unless further steps are taken to effect their removal.

Upon being drawn off from the heavier waxy substances, the cold extract is then passed on to dehydrating tables or pans to a depth of from one to five inches where approximately fifty to ninety per cent of the liquid extract is dehydrated to make a coffee concentrate. The variation in the amount of dehydration is dictated by the results desired, such as coffee body, taste or aroma, and the type of coffee being used. The liquid extract in the dehydrating pan is then raised to a temperature of approximately 115° F. at which temperature it is maintained constantly with as little variation as possible until the top waxy substance ripens or is formed by melting together on the surface of the extract in which condition it is readily skimmed off. In some instances a heavier waxy substance also collects on the bottom of the dehydrating pans so that by this dehydration step at the above temperatures any of the heavy or medium waxy substances which did not settle out during the cold period of quiescent settling will also be definitely separated from the extract when the concentrated extract is drawn off the dehydrating pans.

It is important, however, in practicing this dehydration step of the improved process to constantly maintain the extract at or near the temperature of 115° F. and certainly within the temperature range of from 110° to 117° F. If the temperature of the extract in the dehydrating pans is caused to be raised above 117° F. the top waxy substances of the extract are liable to scorch while the medium waxy substances on the bottom of the pan may be melted and caused to be diffused throughout the extract. If such scorching resulted the concentrate would possess an unpleasant burnt or resinous taste and, therefore, would be unfit for use. On the other hand, if the temperature were allowed to fall below the minimum of the critical range or below 110° F. the rate of evaporation would be considerably retarded and the lighter waxy substances would fail to ripen or collect together on the top of the extract to permit removal. It has been found that the lighter waxy substances form together more readily for removal when the temperature of the extract is kept from 113° to 116° F., the most satisfactory temperature from this standpoint being 115° F.

After the waxy substances have been removed by the above described controlled cold and hot steps and the extract has reached the desired degree of concentration, the concentrated extracts may then be mixed or blended with other concentrated extracts to arrive at an extract that is both pleasant to the taste and smell. The degree of concentration of the resultant coffee liquid is such that only one teaspoonful to a cup of hot water is required for a cup of coffee, and exact measurements have shown that the volatile oils and other soluble ingredients are so thoroughly and completely extracted from the coffee grounds by the above described process that one pound of dry coffee is capable of producing an extract in a quantity sufficient to provide one hundred to one hundred and twenty-five cupfuls of hot coffee.

Although the improved process comprising the invention has been set forth with particularity in the foregoing description, it is to be understood that minor relative variations may be made in quantities, times and temperatures and the like, depending upon the type of coffee and equipment used and results desired, and it is also to be further understood that many various types of suitable devices and equipment may be used in practicing the improved process without departing from the scope of the appended claims.

I claim:
1. The method of preparing an extract of coffee which comprises mixing a quantity of cold water with a quantity of coffee grounds, varying the temperature of the mixture between the temperature of greatest density of water and a lower non-freezing temperature to expand and contract said mixture, then segregating the liquid extract from said coffee grounds; then at successive intervals mixing further quantities of water with said grounds and heating each of said mixtures, each of said mixtures being heated to a higher degree of temperature than the preceding mixture and the extract of each of said mixtures being separated from said grounds after heating before the succeeding quantity of water is added; mixing together all said extracts; and then removing the waxy substances of varying densities from said combined extract.

2. The method of preparing an extract of coffee which comprises mixing a quantity of cold water with a quantity of coffee grounds, varying the temperature of the mixture between the temperature of greatest density of water and a lower non-freezing temperature to expand and contract said mixture, then segregating the liquid extract from said coffee grounds; then at successive intervals mixing further quantities of water with said grounds and heating each of said mixtures, each of said mixtures being heated to a higher degree of temperature than the preceding mixture and the extract of each of said mixtures being separated from said grounds after heating before the succeeding quantity of water is added; quickly cooling each of said extracts to prevent the waxy substance in said extracts from becoming set therein; mixing together all said extracts; and then removing the waxy substances of varying densities from said combined extract.

3. The method of preparing an extract of coffee which comprises mixing a quantity of cold water with a quantity of coffee grounds, varying the temperature of the mixture between the temperature of greatest density of water and a lower non-freezing temperature to expand and contract said mixture, then segregating the liquid extract from said coffee grounds; then at successive intervals mixing further quantities of water with said grounds and heating each of said mixtures, each of said mixtures being heated to a higher degree of temperature than the preceding mixture and the extract of each of said mixtures being separated from said grounds after heating before the succeeding quantity of water is added; quickly cooling each of said extracts to prevent the waxy substance in said extracts from becoming set therein; mixing together all said extracts; and then removing the waxy substances of varying densities from said combined extract by subjecting the extract to a period of quiescence in a cooling zone at a low non-freezing degree of temperature to permit the relatively heavier waxy substances to settle to the bottom, separating the liquid extract from the heavier waxy substances, heating the liquid extract to cause the lighter waxy substances to form at the surface of said extract and then removing the lighter waxy substances.

4. The method of preparing an extract of coffee which comprises mixing a quantity of cold water with a quantity of coffee grounds, varying the temperature of the mixture between the temperature of greatest density of water and a lower non-freezing temperature to expand and contract said mixture, then segregating the liquid extract from said coffee grounds; then mixing a further quantity of water with the said coffee grounds, heating said mixture to a temperature of approximately 125° F. and then separating the second extract from the grounds; then mixing a further quantity of water with said coffee grounds, heating said mixture to a temperature of approximately 195° F. and then separating the third extract from the grounds; then mixing a further quantity of water with said grounds, heating said mixture in a pressure chamber to a temperature within a range of 275° to 300° F. and then separating the fourth extract from the grounds; quickly cooling each of said extracts to prevent the waxy substances in said extracts from becoming set therein; mixing together all said extracts; and then removing the waxy substances of varying densities from said combined extract by subjecting the extract to a period of quiescence in a cooling zone at a low non-freezing degree of temperature to permit the relatively heavier waxy substances to settle to the bottom, separating the liquid extract from the heavier waxy substances, heating the liquid extract to cause the lighter waxy substances to form at the surface of said extract and then removing the lighter waxy substances.

5. The method of preparing an extract of coffee which comprises mixing a quantity of cold water with a quantity of coffee grounds, varying the temperature of the mixture between the temperature of greatest density of water and a lower non-freezing temperature to expand and contract said mixture, then segregating the liquid extract from said coffee grounds; then mixing a further quantity of water with the said coffee grounds, heating said mixture to a temperature of approximately 125° F. and then separating the second extract from the grounds; then mixing a further quantity of water with said coffee grounds, heating said mixture to a temperature of approximately 195° F. and then separating the third extract from the grounds; then mixing a further quantity of water with said grounds, heating said mixture in a pressure chamber to a temperature within a range of 275° to 300° F. and then separating the fourth extract from the grounds; quickly cooling each of said extracts to a non-freezing temperature below 40° F. to prevent the waxy substances in said extracts from becoming set therein; mixing together all said cooled extracts and then removing the waxy substances of varying densities from said combined extract by subjecting the extract to a period of quiescence in a cooling zone at a low non-freezing degree of temperature to permit the relatively heavier waxy substances to settle at the bottom, segregating the liquid extract from the heavier waxy substances, heating the segregated liquid extract to a temperature between 110° to 116° F. to cause the lighter waxy substances to form at the surface of said extract, and then removing the lighter waxy substances.

6. The method of preparing an extract of coffee which comprises mixing a quantity of cold water with a quantity of coffee grounds, varying the temperature of the mixture between the temperature of greatest density of water and a lower non-freezing temperature to expand and contract said mixture; then mixing a further quantity of water at a temperature of approximately 34° F. with the said coffee grounds, heating said mixture to a temperature of approximately 125° F. and then separating the second extract from the grounds; then mixing a further quantity of water at a temperature of approximately 210° F. with said relatively cooler coffee grounds, heating said mixture to a temperature of approximately 195° F. and then separating the third extract from the grounds; then mixing a further quantity of water at a temperature of 200° F. with said grounds, heating said mixture in a pressure chamber to a temperature within a range of 275° to 300° F. and then separating the fourth extract from said grounds; quickly cooling each of said extracts to a non-freezing temperature below 40° F. to prevent the waxy substances in said extracts from becoming set therein; mixing together all said cooled extracts; and then removing the waxy substances of varying densities by subjecting the combined extract to a period of quiescence in a cooling zone at a low non-freezing degree of temperature to permit the relatively heavier waxy substances to settle at the bottom, segregating the liquid extract from the heavier waxy substances, heating the segregated liquid extract to a temperature of approximately 115°, to cause the lighter waxy substances to form at the surface of said extract and then removing the lighter waxy substances.

7. The method of extracting the volatile oils and other soluble ingredients from coffee which comprises mixing a quantity of cold water with a quantity of coffee grounds, varying the temperature of the mixture between the temperature of greatest density of water and a lower non-freezing temperature to expand and contract said mixture, then segregating the liquid extract from said coffee grounds and then at successive intervals mixing further quantities of water with said grounds and heating each of said mixtures, each of said mixtures being heated to a higher degree of temperature than the preceding mixture and the extract of each of said mixtures being separated from said grounds after heating before the succeeding quantity of water is added to the grounds.

8. The method of extracting the volatile oils and other soluble ingredients from coffee which comprises mixing a quantity of cold water with a quantity of coffee grounds, varying the temperature of the mixture between the temperature of greatest density of water and a lower non-freezing temperature to expand and contract said mixture, then segregating the liquid extract from said coffee grounds; then mixing a further quantity of water with the said coffee grounds, heating said mixture to a temperature of approximately 125° F. and then separating the second extract from the grounds; then mixing a further quantity of water with said coffee grounds, heating said mixture to a, temperature of approximately 195° F. and then separating the third extract from the grounds; then mixing a further quantity of water with said grounds, heating said mixture in a pressure chamber to a temperature within a range of 275° to 300° F. and then separating the fourth extract from the grounds; and finally mixing together said extracts secured from said grounds at the various degrees of temperature.

9. The method of extracting the volatile oils and other soluble ingredients from coffee which comprises mixing a quantity of cold water with a quantity of coffee grounds, varying the temperature of the mixture between the temperature of greatest density of water and a lower non-freezing temperature to expand and contract said mixture, then segregating the liquid extract from said coffee grounds; then mixing a further quantity of cold water with the said coffee grounds, heating said mixture to a temperature of approximately 125° F. and then separating the second extract from the grounds; then mixing a further quantity of water at a temperature of approximately 210° F. with said coffee grounds, heating said mixture to a temperature of approximately 195° F. and then separating the third extract from the grounds; then mixing a further quantity of water at a temperature of 200° F. with said grounds, heating said mixture in a pressure chamber to a temperature within a range of 275° to 300° F. and then separating the fourth extract from the grounds; and finally mixing together said extracts secured from said grounds at the various degrees of temperature.

10. A cold water expansion and contraction method of extracting the volatile oils and soluble ingredients of coffee which comprises mixing a quantity of water with a quantity of coffee, maintaining said mixture for a period of saturation at a temperature slightly above freezing but below the temperature of the greatest density of water, raising the temperature of said mixture to the temperature of the greatest density of water to contract the same, then reducing the temperature of said mixture to a lower non-freezing temperature, and finally segregating the liquid extract from said coffee.

11. The method of extracting the volatile oils and soluble ingredients of coffee which comprises mixing a quantity of water with a quantity of coffee, maintaining said mixture at a temperature of approximately 33° F. for a period of saturation, then raising the temperature of said mixture to approximately 40° F., then reducing the temperature of said mixture to approximately 33° F. and finally segregating the liquid extract from said coffee.

12. The method of extracting the volatile oils and soluble ingredients of coffee which comprises mixing a quantity of water at a temperature of approximately 33° F. to a quantity of coffee at a low temperature not less than 10° F., and then varying the temperature of said mixture between a temperature slightly above freezing and the temperature of the greatest density of water to contract and expand the said mixture.

13. The method of extracting the volatile oils and soluble ingredients of coffee which comprises baking said coffee, reducing the moisture content of said coffee to a minimum to render said coffee more water-absorbent, grinding said coffee, mixing a quantity of cold water with a quantity of said grounds, and then varying the temperature of said grounds and mixture between the temperature of greatest density of said water and a lower non-freezing temperature to expand and contract the water in said grounds.

14. The method of removing the waxy substances of varying densities from a liquid coffee extract which comprises the steps of subjecting the extract to a period of quiescence in a cooling zone at a low non-freezing degree of temperature to permit the relatively heavier waxy substances to settle to the bottom of the extract, separating the liquid extract from the heavier waxy substances, heating the liquid extract to cause the lighter waxy substances to form at the surface of said extract, and then removing the lighter waxy substances from the surface of said extract.

15. The method of removing the waxy substances of varying densities from a liquid coffee extract which comprises the steps of subjecting the extract to a period of quiescence in a cooling zone at a low non-freezing degree of temperature to permit the relatively heavier waxy substances to settle to the bottom of the extract, drawing off the liquid extract from the heavier waxy substances, heating the liquid extract to cause the lighter waxy substances to form at the surface of said extract and the relatively medium weight waxy substances remaining in the extract to settle and form at the bottom of the extract, then removing the lighter waxy substances from the surface of said extract, and then separating the extract from the said settled and formed medium weight waxy substances.

16. The method of removing the waxy substances of varying densities from a liquid coffee extract which comprises the steps of subjecting the extract to a period of quiescence in a cooling zone at a low non-freezing degree of temperature to permit the relatively heavier waxy substances to settle at the bottom of the extract, segregating the liquid extract from the heavier waxy substances, heating the segregated liquid extract to a temperature between 110° to 116° F. and maintaining said extract at temperatures within said temperature range to cause the lighter waxy substances to form at the surface of said extract and the relatively medium weight waxy substances remaining in said extract to settle and form at the bottom of the extract, then removing the lighter waxy substances from the surface of said extract, and then segregating the extract from the said settled and formed medium weight waxy substances.

17. The method of removing the waxy substances of varying densities from a liquid coffee extract which comprises the steps of subjecting the extract to a period of quiescence in a cooling zone at a temperature of approximately 33° F. for a period of at least four days to permit the relatively heavier waxy substances to settle at the bottom of the extract, segregating the liquid extract from the heavier waxy substances, heating the segregated liquid extract to a temperature between 113° F. to 116° F. and maintaining said extract at temperatures within said temperature range to cause the lighter waxy substances to form at the surface of said extract, and then removing the lighter waxy substances from the surface of said extract.

18. The method of extracting the volatile oils and soluble ingredients of coffee which comprises mixing a quantity of cold water with a quantity of coffee and then varying the temperature of said mixture between a low non-freezing temperature and a higher temperature of greater density of water to expand and contract the mixture.

WALTER S. FREDRICKSON.